July 11, 1961   H. V. JONES   2,991,695
EYEGLASS FRAME ASSEMBLY WITH EXPANDIBLE LOCKING SCREW
Filed Feb. 12, 1958
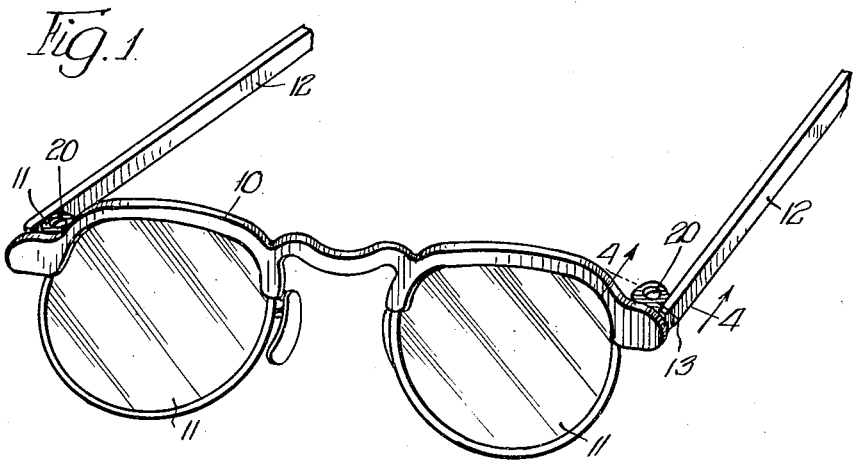
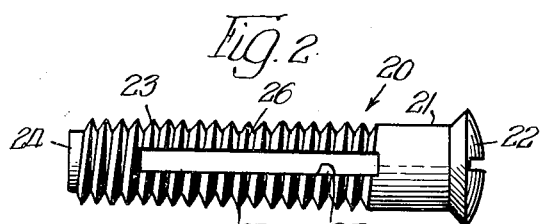
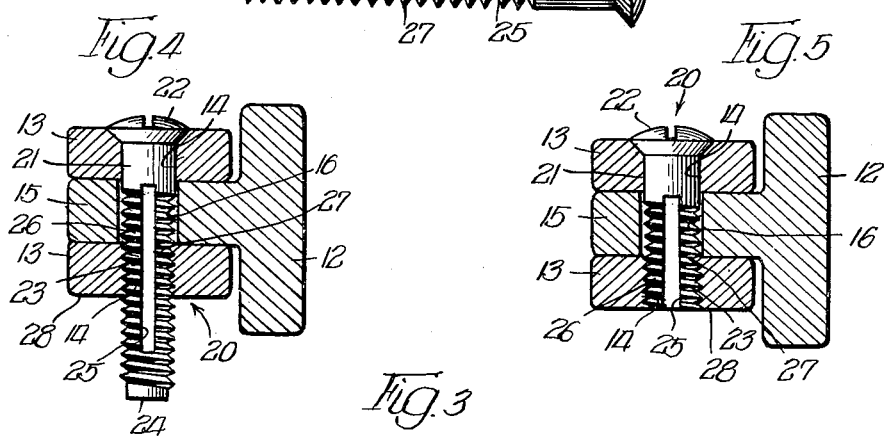
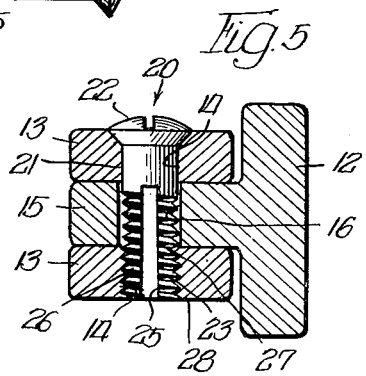
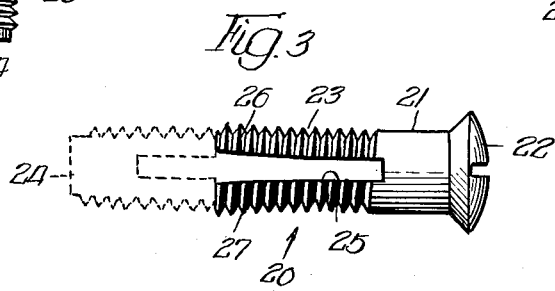
INVENTOR.
Harold V. Jones,
BY
Cromwell, Greist & Warden
Attys.

United States Patent Office 2,991,695
Patented July 11, 1961

2,991,695
EYEGLASS FRAME ASSEMBLY WITH EXPANDIBLE LOCKING SCREW
Harold V. Jones, 120 N. Walnut St., Champaign, Ill.
Filed Feb. 12, 1958, Ser. No. 714,763
3 Claims. (Cl. 88—53)

This invention relates to a self-locking screw and particularly to a screw adapted for resilient engagement in a complementally threaded bore.

The self-locking screws disclosed herein are intended primarily for use in assembling eyeglasses and other relatively small articles wherein of necessity the screws must be very small and as inconspicuous as possible while also being effective for firmly and permanently securing two or more members together. Because of the very small size of such screws, it is very inconvenient and impractical to provide separate locking means therefor. The self-locking screws disclosed herein are particularly well adapted for use in the assembly of both rimless and rim-type glasses or spectacles. In the assembly or production of eyeglasses and spectacles, the self-locking screws disclosed herein may be used for holding lenses, nosepieces and temples in place including such specific applications as securing temples to small hinges mounted on eyeglass frames and as pivot pins for pivotally connecting temples to frames on eyeglasses not utilizing separate hinge members.

It is the general object of this invention to provide a new and improved self-locking screw adapted to resiliently engage a complementally threaded bore.

Another object of the invention is to provide a new and improved self-locking screw for firmly and permanently securing two or more members together which is relatively simple and economical to produce.

A more detailed object of the invention is to provide a new and improved self-locking screw wherein the screw has a length greater than the combined width of the members to be secured together so that the end of the screw when tightened in place projects from the complementally threaded bore within which it has been tightened, wherein internal stresses are instilled in the screw, and wherein an elongated, radial slot is provided in the screw extending into the projecting end thereof so that when the screw is tightened in place the projecting end is adapted to be clipped or cut off through the slot so as to define a pair of spaced, threaded side portions adapted to spread apart into resilient engagement with the complementally threaded bore due to the internal stresses instilled therein.

Another object of the invention is to provide a new and improved method for producing a self-locking screw of the character described.

These and other objects and advantages of the invention will be apparent from a consideration of the preferred form of the self-locking screw which is shown by way of illustration in the accompanying drawings wherein:

FIG. 1 is a perspective view of a pair of eyeglasses wherein a preferred form of the self-locking screw of the invention is utilized as a pivot pin connection between the frame of the eyeglasses and the temples thereof;

FIG. 2 is an enlarged side elevational view of a preferred embodiment of the self-locking screw of this invention before the end is clipped off;

FIG. 3 is an enlarged elevational view of the self-locking screw of FIG. 2 after the end, shown in broken lines, has been clipped off and illustrating the spreading action of the two spaced, threaded side portions due to the internal stresses instilled therein;

FIG. 4 is an enlarged vertical sectional view taken generally along line 4—4 of FIG. 1 before the projecting end of the screw is clipped off; and FIG. 5 is an enlarged vertical sectional view similar to FIG. 4 after the projecting end of the self-locking screw has been clipped off.

The particular pair of eyeglasses shown in FIG. 1 comprises a frame 10, a pair of lenses 11 mounted therein, and a pair of temples 12. Each end of the frame 10 is provided with a pair of integral, vertically spaced horizontally extending members 13 having aligned bores 14 formed therein. The end of each temple 12 adapted to be pivotally connected to the frame 10 is provided with an integral horizontally extending member 15 adapted to be inter-fitted horizontally between the vertically spaced, horizontally extending members 13 of the frame 10, as best shown in FIGS. 4 and 5. A vertically extending bore 16 is formed in the horizontal member 15 of each temple 12 and is adapted to be aligned with the bores 14 formed in the members 13 of the frame 10 when the member 15 is inter-fitted between the vertically spaced members 13. The bore 14 in the lower of the two vertically spaced members 13 is internally threaded or tapped with the bore 16 formed in the member 15 being provided with a diameter slightly larger than the major diameter of the thread formed in the bore 14 of the lower member 13.

A new and improved pivot pin connection for pivotally connecting the temples 12 to the frame 10 is provided in the form of the self-locking screw indicated generally by the reference numeral 20. As best shown in FIGS. 2-5, the self-locking screw 20 comprises an elongated member 21 having a head 22 formed at one end and an externally threaded stem portion 23 terminating at the other end 24 of the member 21. The member 21 has internal stresses instilled therein by any number of well known methods, some of which will be more fully discussed hereinafter.

The member 21 is formed so as to have a length greater than the combined width of the members which it is intended to either pivotally interconnect or permanently secure together. As is evident in the drawings, an elongated, radial slot 25 extends completely through the member 21 intermediate the head 22 and the end 24 of the stem portion 23. It is noted that although the slot 25 extends adjacent to the end 24 of the stem portion 23, it terminates short thereof so that the end 24 is solid and acts as an integral connecting member between the "leading" ends of two spaced, threaded side portions 26 and 27 defined by the slot 25. It is noted further that the slot 25 has a length such that when the member 21 is fully tightened into the aligned bores in the members to be interconnected, the "leading" end of the slot 25 extends beyond the blind surface 28 of the members to be interconnected and into the projecting end 24 of the stem portion 23.

After the member 21 has been fully tightened into the aligned bores of the members to be interconnected, the projecting end of the stem portion 23 of the member 21 is clipped or cut off flush with the blind surface 28 of the members to be interconnected through the slot 25. This cutting or clipping off of the projecting end 24 of the stem portion 23 removes the integral connecting member between the "leading" ends of the spaced, threaded side portions 26 and 27 with the slot 25 becoming an open-ended slot so as to permit the two spaced, threaded side portions 26 and 27 to spread apart into resilient locking engagement with the complementary, threaded bore 14 of the lower member 13 due to the internal stresses instilled therein.

The self-locking screw 20 as described herein provides a connecting member which when properly assembled provides a connection which is firm, non-yieldable, and relatively permanent. In the particular modification shown herein, the bore 16 in the member 15 on each temple 12 is formed slightly larger than the major diameter of the threaded stem 23 of the self-locking screw 20 only to insure a free pivoting action between the temples 12 and the frame 10. Obviously, the self-locking screw 20 illustrated and described herein may also be used to connect two elements or members which are not intended to be pivoted relatively to each other, such as securing the end of a temple to one leaf of a hinge device mounted on a frame of a pair of eyeglasses.

Although the particular self-locking screw described herein is specifically intended for use in assembling eyeglasses and is therefore a relatively very small screw, it is obvious that the principle of the invention disclosed herein is specifically intended for use in assembling eyeglasses is required in any number of other widely diversified assembly applications requiring connecting devices having the characteristics of the self-locking screw disclosed herein. The size of the particular self-locking screw described herein is not intended to be limiting to any degree, the particular environment disclosed herein being merely illustrative.

The method of manufacturing or producing the self-locking screw described and illustrated herein is relatively simple and economical and includes a number of steps, each of which, alone, is well known in the art. However, the particular combination and sequence of steps disclosed herein constitutes a new and inventive concept in the manufacture of screws. First, internal stresses are instilled in round bar stock of a desired size and material for the particular assembly operation. The internal stresses may be instilled by any of the well known mechanical or heat treatment methods.

One of the mechanical methods well known in the art is the passing of the round bar stock through a series of Medart rolls or similar types of rolls wherein the bar stock is simultaneously rotated and severely bent and straightened thus instilling internal stresses in the bar stock.

To instill internal stresses in the round bar stock by heat treatment, the bar stock is heated to a predetermined temperature and held there for a predetermined period of time after which the bar stock is cooled down at a predetermined rate. The specific heat treatment temperatures, time periods and cooling rates depend entirely upon the particular material used and the particular size of the bar stock undergoing the heat treatment. These variables are well known to anyone skilled in the art of heat treatment of metals.

After the internal stresses have been instilled in the bar stock, it is cut to the desired length which as previously described herein is a length greater than the combined width of the members to be interconnected by the self-locking screws. This length, of course, may vary with each particular assembly operation. Then a head 22 and a stem portion 23 are formed on each length of the bar stock after which an elongated, radial slot 25 is cut completely through the stem portion 23 of a length such that when the finished self-locking screw is tightened in place the slot 25 will extend into the projecting end 24 of the stem portion but will terminate short thereof so that the screw 20 will have a solid stem end. After the slot 25 has been formed in the stem portion 23, the stem portion 23 is externally threaded with the proper thread and the self-locking screw 20 is ready to be utilized in an assembly operation.

In utilizing the self-locking screw 20 described and illustrated herein in an assembly operation, the self-locking screw 20 is merely tightened into the aligned bores of the members to be interconnected, at least one of the bores being complementally internally threaded, after which the projecting end 24 of the stem portion 23 is clipped or cut off flush with the blind surface 28 of the members to be interconnected and through the slot 25, thus permitting the two spaced, threaded side portions 26 and 27 to spread apart into resilient locking engagement with the complementally threaded bore as a result of the internal stresses instilled therein.

It will be understood that certain changes may be made in the structure of or the method of producing the self-locking screw disclosed herein without departing from the spirit and scope of the invention as defined in the appended claims.

I claim:

1. In combination, an eyeglass frame and temple assembly wherein the frame and the temples are provided with interfitting portions having aligned, through bores one of which is internally threaded and one of which has a diameter slightly larger than the major diameter of the threaded bore; a self-locking connector pivotally interconnecting each temple and one side of the frame comprising, an elongated member having a head and an externally threaded stem portion inserted through said larger bore and screwed into said threaded bore, said threaded stem portion having a uniform thread with a constant major and a constant minor diameter said member being internally stressed and having a length such that when fully engaged in said aligned bores the leading end of the threaded stem projects therefrom, and means defining an elongated, radial slot through said stem portion terminating at a point short of the leading end of said stem portion but within said projecting end of said stem portion, said projecting end of said stem portion being adapted to be cut off through said slot to define a pair of spaced, threaded side portions adapted to spring apart into resilient engagement with said threaded bore due to the internal stresses instilled therein.

2. In combination, a self-locking type screw adapted for assembling eyeglasses and other articles which are so small that it is inconvenient and impractical to utilize a separate locking member, and a pair of members to be interconnected, said members having aligned bores at least one of which is internally threaded, said screw comprising, an elongated element having a head and a stem provided with an external uniform thread adapted for threaded engagement in the internally threaded bore of said one member, said uniform thread on said stem having a constant major and a constant minor diameter, said element being of a length such that the leading end of the threaded stem projects from the aligned bores of said pair of members when fully screwed therein, and means defining an elongated, radial slot extending completely through said threaded stem intermediate the ends thereof whereby to define a pair of spaced, threaded side portions integrally connected at their leading and trailing ends, said slot being of a length such that it extends into said projecting end of said stem, said element having internal stresses instilled therein whereby cutting off said projecting end of said stem flush with the blind terminus of the aligned bores and through said slot removes the integral connection between the leading ends of said spaced, threaded side portions permitting them to spread apart into resilient locking engagement with the internally threaded bore of said one member due to the internal stresses instilled therein.

3. In combination, at least two members to be connected together, said members having aligned bores at least one of which is internally threaded, and a self-locking screw for interconnecting said members, said screw comprising, an elongated member having a head and an externally threaded stem portion, said stem portion having a uniform thread with a constant major and a constant minor diameter, and means defining an elongated, radial slot extending completely through said stem portion intermediate the head and the stem end of said member whereby to define a pair of spaced, threaded side portions integrally connected at their adjacent ends, said member being internally stressed and being of a length such that when fully engaged in said bores of said members the integral stem end of said member and the adjacent end of said slot project therefrom whereupon said projecting end of said stem portion is adapted to be clipped off through said slot to permit said pair of spaced, threaded side portions to spring apart into resilient engagement with said internally threaded bore of said one member due to said internal stresses instilled in said elongated member.

References Cited in the file of this patent

UNITED STATES PATENTS

| | | |
|---|---|---|
| 278,230 | Fairlamb | May 22, 1883 |
| 672,132 | Morgan et al. | Apr. 16, 1901 |
| 2,067,272 | Keller | Jan. 12, 1937 |
| 2,266,758 | Holtz | Dec. 23, 1941 |
| 2,412,120 | Bouchard | Dec. 3, 1946 |
| 2,676,344 | Lovisek | Apr. 27, 1954 |
| 2,727,256 | Moore | Dec. 20, 1955 |
| 2,843,861 | Gandy | July 22, 1958 |

FOREIGN PATENTS

| | | |
|---|---|---|
| 20,191 | Austria | May 25, 1905 |

UNITED STATES PATENT OFFICE
CERTIFICATE OF CORRECTION

Patent No. 2,991,695                     July 11, 1961

Harold V. Jones

It is hereby certified that error appears in the above numbered patent requiring correction and that the said Letters Patent should read as corrected below.

Column 3, line 16, for "specifically intended for use in assembling eye-" read -- equally applicable to screws of any size re- --.

Signed and sealed this 19th day of December 1961.

(SEAL)
Attest:

ERNEST W. SWIDER
Attesting Officer

DAVID L. LADD
Commissioner of Patents
USCOMM-DC